(12) United States Patent
Uchiyama

(10) Patent No.: US 6,731,341 B1
(45) Date of Patent: May 4, 2004

(54) ELECTRONIC STILL CAMERA WITH CASING CONTAINING IMAGE-CAPTURING

(75) Inventor: Takayuki Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/267,656

(22) Filed: Mar. 15, 1999

(30) Foreign Application Priority Data

Mar. 16, 1998 (JP) .......................................... 10-065165

(51) Int. Cl.[7] .............................................. H04N 5/225
(52) U.S. Cl. ...................................... 348/374; 361/690
(58) Field of Search ................................ 348/373, 374, 348/375, 376; 361/690

(56) References Cited

U.S. PATENT DOCUMENTS

| 5,664,243 | A | * | 9/1997 | Okada et al. | 396/374 |
| 5,729,291 | A | * | 3/1998 | Tanaka et al. | 348/373 |
| 5,777,846 | A | * | 7/1998 | Hayes et al. | 361/690 |
| 5,875,034 | A | * | 2/1999 | Shintani et al. | 348/376 |
| 5,978,609 | A | * | 11/1999 | Aoki | 396/429 |
| 6,181,380 | B1 | * | 1/2001 | Toyofuku et al. | 348/373 |
| 6,445,417 | B1 | * | 9/2002 | Yoshida et al. | 348/374 |
| 6,469,738 | B1 | * | 10/2002 | Hayashi | 348/376 |

FOREIGN PATENT DOCUMENTS

| JP | 02277299 A | * | 11/1990 | ............ H05K/7/20 |
| JP | 04137870 A | * | 5/1992 | .......... H04N/5/225 |

* cited by examiner

*Primary Examiner*—Vu Le
*Assistant Examiner*—Jason Whipkey
(74) *Attorney, Agent, or Firm*—Oliff & Berridge, PLC

(57) ABSTRACT

An electronic still camera has a casing in which an image-capturing element is provided. And the casing includes: a body middle portion in which the image-capturing element is provided in close proximity to a rear wall of the body middle portion; a grip unit that is formed continuous to the body middle portion on one side in a left/right direction and projects out further forward relative to a front wall of the body middle portion; and an electrical part housing unit that is formed continuous to the body middle portion on another side in the left/right direction and has a housing space. One or more recording compression circuit parts are provided inside the grip unit; and one or more image display parts are provided inside the electrical part housing unit.

8 Claims, 5 Drawing Sheets

ELECTRONIC STILL CAMERA WITH CASING CONTAINING IMAGE-CAPTURING

INCORPORATION BY REFERENCE

The disclosure of the following priority application is herein incorporated by reference:

Japanese Patent Application No. 10-65165 filed Mar. 16, 1998.

BACKGROUND OF THE INVENTION

1. Field of the Invention

The present invention relates to an electronic still camera and more specifically, it relates to the positional arrangement of electric circuit parts and image display system parts.

2. Description on the Related Art

There are electronic still cameras in the known art that perform photoelectric conversion of photographic light from a subject by employing an imaging element and store the subject image as electronic data. A single lens reflex type electronic still camera is a type of electronic still camera. As in the case with silver halide type cameras, there is a need for achieving miniaturization and improvements in the operability and image quality with respect to such single lens reflex type electronic still cameras. While a single lens reflex type electronic still camera shares certain common aspects with a silver halide type camera, its structure is essentially different since it stores subject images as electronic data. FIG. 5 illustrates an example of single lens reflex type electronic still cameras in the known art. It is to be noted that the left/right direction and the front/rear direction in the figure respectively represent the left/right direction and the front/rear direction with respect to the single lens reflex type electronic still camera.

In the figure, reference number 101 indicates the single lens reflex type electronic still camera which is provided with a casing 102.

An opening is formed on the left side of a front wall 103 of the casing 102. A cylindrical portion is provided, constituting an integrated unit with the opening, and a lens 104 is secured within the cylindrical portion.

An image-capturing element 105 is provided at an approximate center of the casing 102 in the front/rear direction. The image-capturing element 105, which extends perpendicular to a plane M1 that includes the lens optical axis of the lens 104 and the viewfinder optical axis, is positioned to achieve symmetry in the left/right direction.

A grip unit is formed at the right side of the casing 102 in the left/right direction. The grip unit 106 is formed with a bend projecting out a further forward relative to the front wall 103 of the casing 102.

Thus, only the grip unit 106 is provided to the right side relative to the plane Ml that includes the lens optical axis and the viewfinder optical axis. As a result, there is no portion on the left side that corresponds to the grip unit 106 so that the casing 102 forms a rough L shape in the plan view, which is asymmetrical in the left/right direction.

An image-capturing element board 107, a first electric circuit board 108 and a second electric circuit board 109 are positioned sequentially at the rear side of the image-capturing element 105.

On the first electric circuit board 108 and the second electric circuit board 109, an image display drive circuit such as, for instance, an image display circuit and an inverter circuit, and a recording compression circuit are mounted.

At the rear side of the second electric circuit board 109, an illuminating light source 110 is provided at a position that is almost aligned with that of the image-capturing element 105 in the left/right direction, with a liquid crystal display unit 111 provided at the rear side of the illuminating light source 110.

A battery box 112 is provided inside the grip unit 106, with batteries 113 housed inside the battery box 112.

Toward the rear and to the right of the second electric circuit board 109, a connector 114 for an external recording member is provided along the left/right direction.

In the single lens reflex type electronic still camera 101 in the known art, in which the first electric circuit board 108 and the second electric circuit board 109 are provided at the rear side of the image-capturing element 105 next to each other extending in the left/right direction, the entire thickness of the casing 2 is much larger than that in a silver halide type single lens reflex camera. This results in the single lens reflex type electronic still camera 101 becoming bulky and difficult to hand hold, which, in turn, results in a great reduction in operability and poor ergonomics.

In addition, the single lens reflex type electronic still camera 101, whose casing 102 forms a rough L shape in the plan view that is asymmetrical in the left/right direction relative to the plane M that includes the lens optical axis and the viewfinder optical axis, poses problems in that its weight balance is different from that of a typical silver halide type single lens reflex camera in the prior art and that the left side of the casing 102 is awkward to hold by hand, resulting in a great reduction in operability and ergonomics.

Furthermore, since the image-capturing element 105 is provided at a position close to the first electric circuit board 108, the second electric circuit board 109 and the illuminating light source 110, the temperature at the image-capturing element 105 is caused to rise by the heat generated at the first electric circuit board 108 and the second electric circuit board 109 and the heat generated by the illuminating light source 110 to lead to a poor S/N ratio at the image-capturing element 105, which, in turn, results in deterioration in the image quality. It is to be noted that while it is conceivable to separate the image-capturing element 105 over a distance from the first electric circuit board 108 in the front/rear direction to prevent the temperature at the image-capturing element 105 from rising, this configuration will increase the entire thickness of the casing 102. Therefore, this solution is not desirable from the viewpoint of improving the operability.

SUMMARY OF THE INVENTION

An object of the present invention is to provide an electronic still camera which achieves miniaturization through a reduction in the entire thickness of the casing, achieves operability substantially equal to that of a silver halide type single lens reflex camera in the prior art with a similar shape thereto and prevents the image quality from becoming poor by ensuring that the image-capturing element is not affected by the heat generated at electric circuit boards.

In order to attain the above object, an electronic still camera according to the present invention has a casing in which an image-capturing element is provided. And the casing comprises: a body middle portion in which the image-capturing element is provided in close proximity to a rear wall of the body middle portion; a grip unit that is formed continuous to the body middle portion on one side in a left/right direction and projects out further forward relative to a front wall of the body middle portion; and an electrical part housing unit that is formed continuous to the body middle portion on another side in the left/right direction and has a housing space. One or more recording compression circuit parts are provided inside the grip unit; and one or more image display parts are provided inside the electrical part housing unit.

Another electronic still camera has a casing in which an image-capturing element is provided. And the casing comprises: a body middle portion in which the image-capturing element is provided in close proximity to a rear wall of the body middle portion; a first electrical part housing unit that is formed continuous to the body middle portion on one side in a left/right direction and has a housing space; and a second electrical part housing unit that is formed continuous to the body middle portion on another side in the left/right direction and has a housing space. One or more high heat generating electric circuit boards are provided inside the first electrical part housing unit; and one or more high heat generating electric circuit boards are provided inside the second electrical part housing unit.

DESCRIPTION OF THE PREFERRED EMBODIMENTS

The following is an explanation of preferred embodiments of the present invention given in reference to the drawings.

Figure 1:
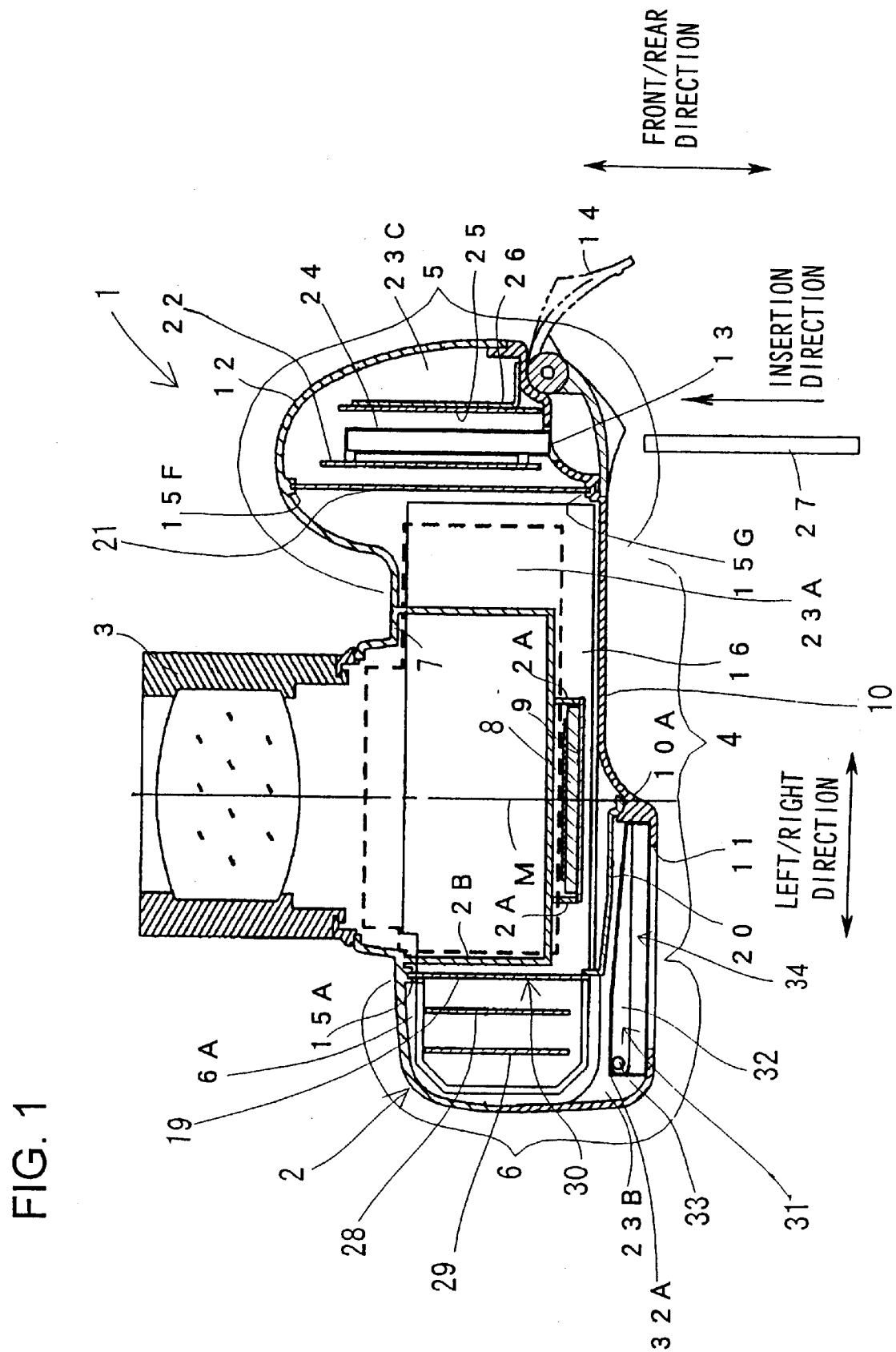
FIG. 1 is a cross section illustrating the electronic still camera in an embodiment of the present invention.
Figure 2:
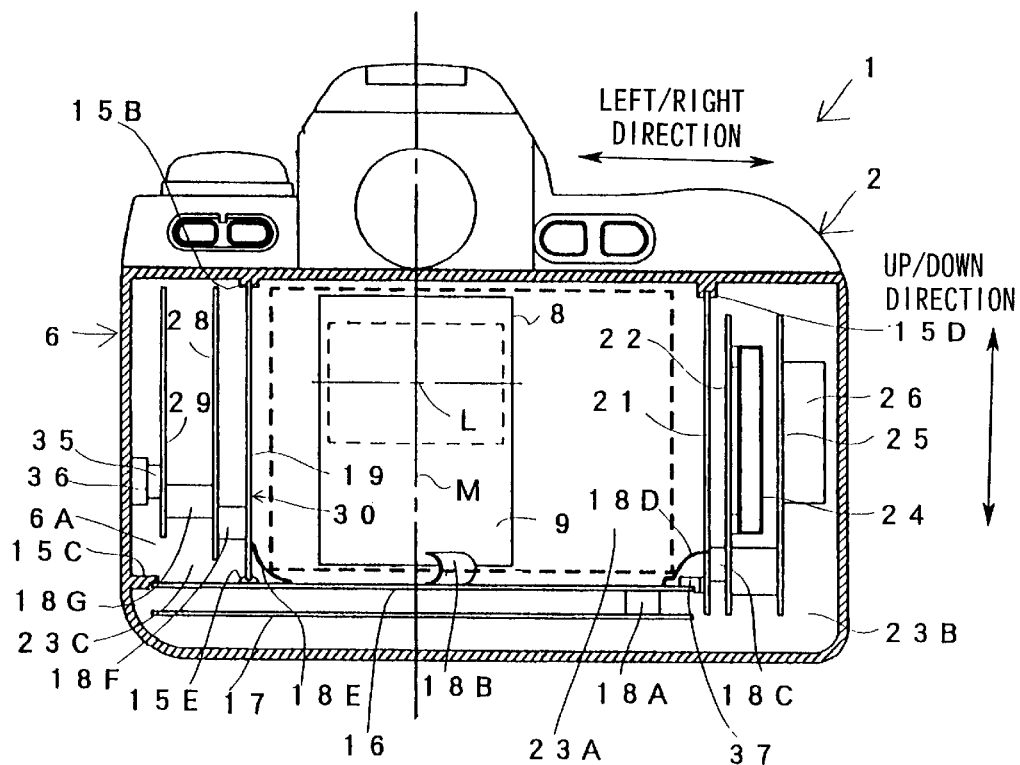
FIG. 2 is a rear view of the electronic still camera with a portion of it cut away.
Figure 3:
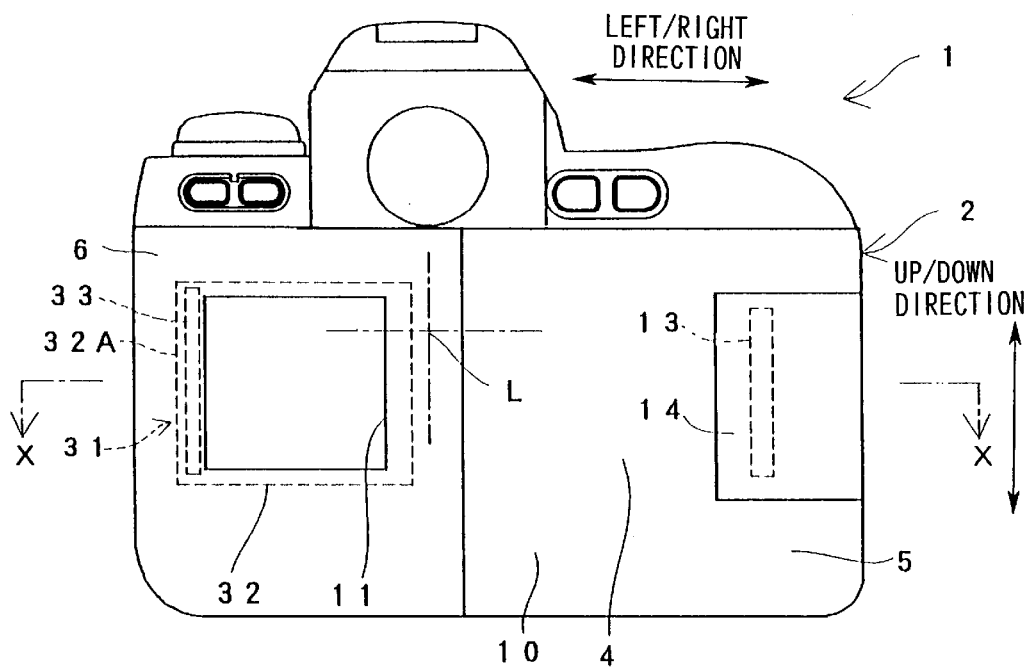
FIG. 3 is a rear view of the electronic still camera.

In reference to FIGS. 1~3, a single lens reflex type electronic still camera is explained as an example of the electronic still camera in an embodiment of the present invention. FIG. 1 is a cross section along line X—X in FIG. 3. It is to be noted that the left/right direction, the front/rear direction and the up/down direction indicating in the figures represent the left/right direction, the front/rear direction and the up/down direction with respect to the single lens reflex type electronic still camera.

In the figures, the single lens reflex type electronic still camera 1 in the embodiment includes a casing 2, an interchangeable lens unit 3 that is provided at the casing 2. It is to be noted that the single lens reflex type electronic still camera 1 is internally provided with mechanisms such as a lens system and a viewfinder device similar to those employed in a silver halide single lens reflex type camera in the known art.

The casing 2 includes a body middle portion 4, a grip unit 5 which is formed continuous to the body middle portion 4 to the right in the left/right direction and an electrical part housing unit 6 which is formed continuous to the body middle portion 4 to the left in the left/right direction and is provided with a housing space 6A.

The interchangeable lens unit 3 is constituted of a cylindrical body and a lens secured to the internal wall surface of the cylindrical body.

A mount portion having an opening is formed at a front wall 7 in the area that is located at the body middle portion 4, with the interchangeable lens unit 3 mounted at the mount portion in such a manner that it can be mounted and dismounted freely.

Inside the casing 2, an image-capturing element 8 constituted of a CCD is provided at the image forming position of the lens, extending perpendicular to a plane M that includes the lens optical axis and the viewfinder optical axis. The image-capturing element 8 is mounted on an image-capturing element board 9 and is positioned close to a portion of the rear wall 10 that is located at the body middle portion 4. The image-capturing element board 9 is mounted at a body mounting portion 2B via side brackets 2A and 2A. Now, it is understood the any increase in temperature at the image-capturing element 8 and the image-capturing element board 9 greatly affects the image quality performance.

In the left side portion of the casing 2, an image display window 11, which achieves a quadrangular shape viewed from the rear, is formed (see FIG. 3).

At the grip unit 5, which is provided with a bend 12 projecting out further forward than the portion of the front wall 7 of the casing 2 located at the body middle portion 4, a slot hole 13 is formed along the up/down direction in an area of the rear wall 10 at the grip unit 5 (see FIG. 3) and an open/close lid 14 is rotatably mounted further outward to the right of the slot hole 13. The open/close lid 14, which is illustrated in FIG. 1 in its open state (indicated by the chain double-dashed line) is formed to have a length that allows the slot hole 13 to become closed when it is set in a closed state.

As illustrated in FIG. 1, a first guide rail 15A is formed in an area of the front wall 7 that is located at the electrical part housing unit 6. As illustrated in FIG. 2, a second guide rail 15B is formed at an upper wall of the electrical part housing unit 6, whereas a third guide rail 15C is formed at the lower portion of a side wall of the casing 2 located at the electrical part housing unit 6. A fourth guide rail 15D is formed at the upper wall of the grip unit 5. As illustrated in FIG. 1, at the grip unit 5, a fifth guide rail 15F and a sixth guide rail 15G are formed.

At the third guide rail 15C, a first image capturing circuit board 16 is horizontally inserted and positioned in a state in which it is in close proximity to the bottom of the casing 2, with a second image capturing circuit board 17 provided under the first image capturing circuit board 16. Electric circuits for processing image signals from the image-capturing element 8 such as an A/D circuit are mounted at the first and second image capturing circuit boards 16 and 17. The first image capturing circuit board 16 is connected to the second image capturing circuit board 17 via a first wiring 18A. The first and second image capturing circuit boards 16 and 17 are housed by utilizing the space within the casing 2 in the up/down direction. At the first and second image capturing circuit boards 16 and 17, any temperature increase greatly affects the image quality performance.

The first image capturing circuit board 16 is connected to the image-capturing element board 9 via a second wiring 18B.

In this structure, the image-capturing element 8 and the first and second image capturing circuit boards 16 and 17 are driven only during a photographing operation and are not driven constantly. For this reason, while they constitute sources of heat, the quantity of heat generated by them is not great.

An image display circuit board 19 is inserted at the first guide rail 15A, the second guide rail 15B and a seventh guide rail 15E provided on the first image capturing circuit board 16 and is connected. The image display circuit board 19, which is a low heat generating electric circuit board, is located to the left of the image-capturing element 8, at a right angle to the first image capturing circuit board 16 and parallel to the plane M that includes the lens optical axis and the viewfinder optical axis.

A partitioning plate 20 is provided extending from the rear end of the image display circuit board 19 to a staged portion 10A of the rear wall 10 (see FIG. 1). By constituting the partitioning plate 20 with a material having a low thermal conductivity such as plastic, the heat blocking effect can be enhanced. The partitioning of the internal space of the casing 2 achieved by the partitioning plate 20 does not have to constitute a completely sealed structure and some allowance may be made for gaps. In addition, it is not always necessary to divide the internal space with the partitioning plate 20, and any structure that prevents convection of air may be adopted.

At the fifth guide rail 15F, the sixth guide rail 15G and the fourth guide rail 15D, a first recording compression circuit board 21, provided as a recording compression circuit part, is inserted. The first recording compression circuit board 21, which is a low heat generating electric circuit board, is positioned at a right angle to the first image capturing circuit board 16 and parallel to the plane M that includes the lens optical axis and the viewfinder optical axis. To the right of the first recording compression circuit board 21, a second recording compression circuit board 22 is provided parallel to the first recording compression circuit board 21. The first recording compression circuit board 21 is connected to the second recording compression circuit board 22 via a third wiring 18C.

By partitioning the internal space of the casing 2 with the image display circuit board 19, the partitioning plate 20, the first recording compression circuit board 21 and the first image capturing circuit board 16 in this manner, the internal space of the casing 2 is divided into an internal space constituted of a middle space 23A, a first side space 23B and a second side space 23C. The image-capturing element 8 is provided in the middle space 23A.

The first recording compression circuit board 21, the second recording compression circuit board 22 and an external recording member connector 24, which are recording compression circuit parts, are provided sequentially toward the outside in the left/right direction (to the right in FIG. 1) inside the grip unit 5 of the casing 2. Toward the outside relative to the external recording member connector 24, a power source circuit board 25 is provided in close proximity to a side wall of the casing 2. The power source circuit board 25 which is provided further toward the outside relative to the second recording compression circuit board 22 is secured to the grip unit 5 of the casing 2 via a metal plate heat sink 26, to constitute a high heat generating electric circuit board. The second recording compression circuit board 22, the external recording member connector 24 and the power source circuit board 25 are housed in the second side space 23C.

The first recording compression circuit board 21 with parts mounted on both surfaces is connected to the first image capturing circuit board 16 via a wiring 18D. Signals are transmitted and received through the wirings 18C and 18D. By employing the first recording compression circuit board 21 which allows mounting on both surfaces, the need for providing a clearance for wiring is eliminated, and partitioning of the internal space of the casing 2 can be achieved through a simple structure utilizing the first recording compression circuit board 21.

The external recording member connector 24 is provided parallel to the plane M that includes the lens optical axis and the viewfinder optical axis and opens at the slit hole 13 provided in an area of the rear wall 10 located at the grip unit 5.

An external recording member 27 such as a smart medium is inserted at the external recording member connector 24, and the open/close lid 14 is closed from the outside of the external recording member 27 in this state. Since the external recording member connector 24 is provided inside the grip unit 5 parallel to the plane M that includes the lens optical axis and the viewfinder optical axis, the slit hole 13 at the grip unit 5 is held by hand at all times while the single lens reflex type electronic still camera 1 is engaged in operation so that the risk of inadvertently removing the external recording member 27 is eliminated with a high degree of reliability.

The housing space 6A at the electrical part housing unit 6 is partitioned off by the image display circuit board 19, with the first side space 23B formed to the left of the image display circuit board 19 and a first inverter circuit board 28 and a second inverter circuit board 29 provided in the first side space 23B toward the outside in the left/right direction relative to the image display circuit board 19 (to the left in FIG. 1). On the first and second inverter circuit boards 28 and 29, which are circuits provided to drive the illuminating light source, high heat generating parts such as transformers stepping up the voltage are mounted and thus, they constitute high heat generating electric circuit boards. While the first and second inverter circuit boards 28 and 29 constitute sources of heat, their location near a side wall of the electrical part housing unit 6 at the casing 2 improves the heat discharge efficiency and facilitates assembly.

The image display circuit board 19, with parts mounted on both surfaces is connected to the first image capturing circuit board 16 via a wiring 18E and is also connected to the first inverter circuit board 28 via a wiring 18F. By utilizing the image display circuit board 19 as a partitioning plate, the need for providing clearance for wiring is eliminated so that partitioning of the internal space of the casing 2 can be achieved through a simple structure. Signals are transmitted and received through the wirings 18E and 18F. The first inverter circuit board 28 is connected to the second inverter circuit board 29 via a wiring 18G. With electronic circuit boards provided at locations corresponding to the individual functions of the electronic circuit in this manner, the number of wirings present between the electronic circuit boards can be reduced and separate tests can be conducted to check the individual functions.

The image display circuit board 19, and the first and second inverter circuit boards 28 and 29 constitute an image display drive circuit 30.

In addition, an image display unit 31 is provided rearward relative to the partitioning plate 20 and the housing space 6A inside the casing 2. The image display unit 31, which is constituted of a liquid crystal display 32 in the known art and an illuminating light source 33, is positioned offset to the left relative to the image-capturing element 8. The liquid crystal display 32, which is constituted to form a quadrangular shape viewed from the rear, lies at a right angle to the lens optical axis L. The illuminating light source 33, which is constituted to achieve a cylindrical shape along the up/down direction in FIG. 3, is provided parallel to the longitudinal side 32A of the quadrangular liquid crystal display 32 that is the furthest away from the lens optical axis L.

The image display drive circuit 30 and the image display unit 31 constitute an image display system 34. The image display system 34 is located on the opposite side of the recording compression circuit system and the power source circuit board 25 in the left/right direction across the plane M that includes the lens optical axis and the viewfinder optical axis.

Furthermore, a board 35 having a heat generating element is provided close to the side wall of the electrical part housing unit 6 at the casing 2, with the heat generating element mounted toward the side wall of the casing 2. A heat sink member 36 is mounted at the side wall of the casing 2. Thus, the heat of the board 35 provided with the heat generating element is discharged through the heat sink member 36 and the like to achieve efficient heat discharge.

Moreover, the wirings 18A, 18B, 18C, 18D, 18E, 18F, and 18G mentioned earlier are each constituted of lead wires, flexible board, a board connector or the like, and through these wirings, the individual electric circuit boards described above are linked. In addition, the electric circuit boards are secured to the casing 2.

The right end of the first image capturing circuit board 16 is in contact with the internal surface of the first recording compression circuit board 21 via a cushion member 37 so that the misalignment of the first image capturing circuit board 16 and the first recording compression circuit board 21 in the left/right direction can be absorbed during the assembly process.

It is to be noted that in FIGS. 1 and 2, the areas indicated with bold dotted lines are areas where electric circuit boards and the like cannot be mounted and are utilized as space for mechanisms and optical paths. For instance, in the space in front of the image-capturing element 8 inside the casing 2, mechanisms similar to the reflex type viewfinder device (having a viewfinder function and a photographing function achieved with a mirror), the shutter and the like in a silver halide type single lens reflex camera are mounted.

Next, actions in this embodiment are explained.

Figure 5:
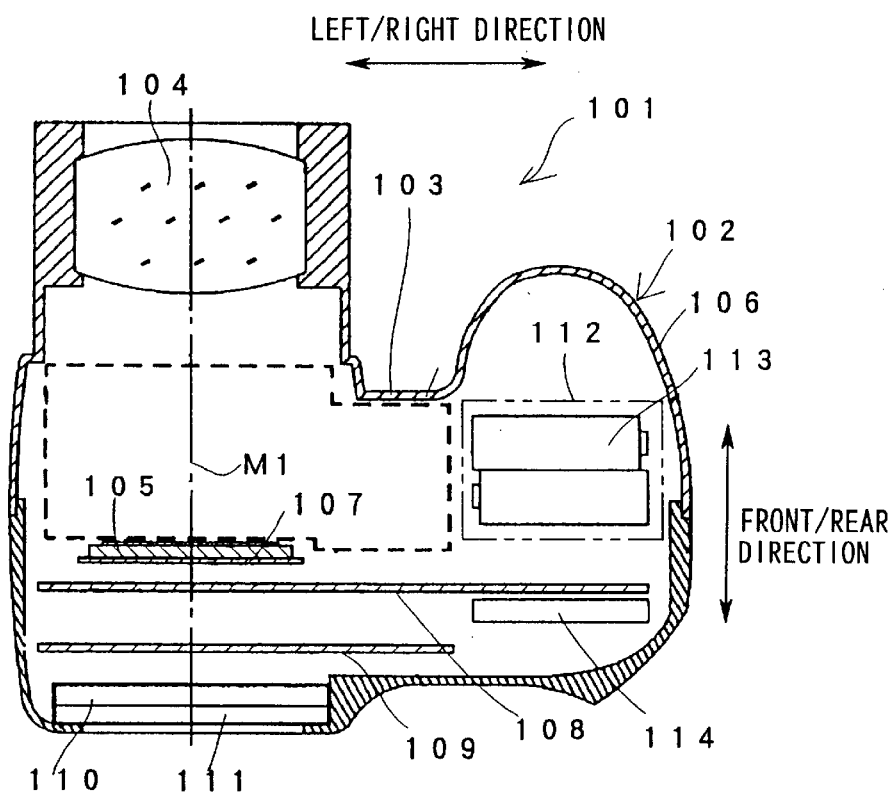
FIG. 5 is a cross section illustrating an electronic still camera in the prior art.

As described above, within the casing 2, the first recording compression circuit board 21, the second recording compression circuit board 22 and the external recording member connector 24 constituting recording compression circuit parts are provided inside the grip unit 5 and the image display drive circuit 30 and the image display unit 31 constituted of the liquid crystal display 32 and the illuminating light source 33 are provided as the image display parts inside the electrical part housing unit 6. Consequently, the recording compression circuit parts and the image display parts are provided separately from each other to the left and to the right in correspondence to their functions, which eliminates the necessity for providing electric circuit boards equivalent to the first electric circuit board 108 and the second electric circuit board 109 illustrated in FIG. 5 at the body middle portion 4 of the casing 2 as in the prior art. This, in turn, achieves a reduction in the thickness of the body middle portion 4 of the casing 2 to prevent an increase in the thickness of the casing 2. In other words, the thickness of the casing 2 is not affected by the presence of the electric circuit boards, as has been the case in the prior art.

As a result, while the single lens reflex type electronic still camera 1 assumes a structure which enables electrical recording of a subject, a weight balance to the left and right, which is similar to that in the silver halide type single lens reflex camera internally provided with a film feed mechanism and thus having a different internal structure, is assured. In addition, the grip unit 5 and the electrical part housing unit 6 are utilized as components to be operated by hand to assure a high degree of operability.

Next, the effect of heat on the image-capturing element 8 is explained.

Since the image-capturing element 8, which is readily affected by heat and electrical noise, is provided away from the image display parts (the first and second inverter circuit boards 28 and 29 and the illuminating light source 33) that generate heat, the image-capturing element 8 is protected from the heat generated by the image display parts.

In addition, the internal space of the casing 2 is divided into the internal space constituted of the middle space 23A where the image-capturing element 8 is provided, the first side space 23B and the second side state 23C by two low heat generating electric circuit boards (the image display circuit board 19 and the first recording compression circuit board 21) whose performance is not greatly affected by heat.

The internal space constituted of the middle space 23A where the image-capturing element 8 is provided is partitioned to be separate from the first side space 23B where the high heat generating electric circuit boards (the first and second inverter circuit boards 28 and 29) are provided and the second side space 23C where the high heat generating electric circuit board (the power source circuit board 25) is provided.

Consequently, the heat generated at the high heat generating electric circuit boards where the temperature increases greatly is prevented by the two low heat generating electric circuit boards from being readily transmitted to the internal space constituted of the middle space 23A where the image-capturing element 8 is provided. Thus, in the internal space constituted of the middle space 23A where the image-capturing element 8 is provided, any increase in the temperature of the image-capturing element caused by the air convection of the heat generated at the high heat generating electric circuit boards is suppressed.

To explain this point in further detail, the power source circuit board 25, the first and second inverter circuit boards 28 and 29, the image display unit 31 and the like operate over a long period of time since they are used for checking and editing the photographed images. The power source circuit board 25, the first and second inverter circuit boards 28 and 29, the image display unit 31 and the like in a high temperature state become sources of heat and the heat generated by them accounts for a great portion of the heat generated by the entire apparatus. The heat generated as these circuit boards are driven induces an increase in the internal temperature, which, in turn, results in an increase in the temperature of the image-capturing element 8 to lead to deterioration in the S/N of the image-capturing element 8 which is a crucial factor in determining the quality of the image. However, the power source circuit board 25 and the first and second inverter circuit boards 28 and 29 that constitute sources of heat in this embodiment, are provided at positions over a distance from the image-capturing element 8 and the first image-capturing circuit board 16 and in close proximity to the side walls of the casing 2, thereby achieving a structure which facilitates heat discharge from the power source circuit board 25 and the first and second inverter circuit boards 28 and 29 to the casing 2. As a result, a positional arrangement is achieved for the image-capturing element 8 that sets it at the position least likely to be affected by the heat sources.

In addition, since the image-capturing element 8 is isolated inside from the high heat generating electric circuit boards (the first and second inverter circuit boards 28 and 29, and the power source circuit board 25) by the two low heat generating electric circuit boards (the image display circuit board 19 and the first recording compression circuit board 21) and the partitioning plate 20 inside the casing 2, no increase in the temperature occurs at the image-capturing element 8 due to convection of the internal air that has been warmed by the heat generated at the high heat generating electric circuit boards so that the S/N does not deteriorate greatly due to an increase in the temperature at the image-capturing element 8. It is to be noted that while it is conceivable that the use of the image display circuit board 19 to partition the internal space of the casing 2 may cause the temperature rise to superimpose noise on the display image, noise is not superimposed on the image information itself, and this means that as long as the image information is verified by using another means for display, it can be confirmed that a high quality image has been obtained. By partitioning the internal space of the casing 2 using the image display circuit board 19 and the first recording compression circuit board 21 constituted of low heat generating electric circuit boards, image information in a desirable state can be recorded, ease of assembly work is achieved and miniaturization is realized.

Next, actions through the positional arrangement of the illuminating light source 33 at the image display unit 31 is explained.

Since the illuminating light source 33 at the image display unit 31 is formed in a cylindrical shape and is provided parallel to the longitudinal side 32A of the quadrangular liquid crystal display 32 that is the furthest away from the lens optical axis L, the illuminating light source 33 is separated from the image-capturing element 8 over a distance so that the temperature at the image-capturing element 8 is prevented from increasing due to the heat generated at the illuminating light source 33 at the image display unit 31 to achieve a high quality photographic image.

In other words, the illuminating light source 33 constituting the heat generating portion in the image display unit 31, which is provided parallel to the longitudinal side 32A of the liquid crystal display 32, is at the position furthest away from the image-capturing element 8, which also allows heat to be discharged to the casing 2 from two directions. This improves the efficiency of heat discharge and also minimizes the degree to which the image-capturing element 8 is affected by heat. The heat discharge efficiency is further improved by constituting the casing 2 with a material having high thermal conductivity such as metal, so that the degree of deterioration of the S/N ratio at the image-capturing element 8 caused by external noise can be minimized to achieve a stable high quality image.

The following advantages are achieved through the structure described above.

Firstly, since the first recording compression circuit board 21, the second recorded compression circuit board 22 and the external recording member connector 24 constituting the recording compression circuit parts are provided inside the grip unit 5 and the image display drive circuit 30 and the image display unit 31 constituted of the liquid crystal display 32 and the illuminating light source 33, constituting image display parts, are provided inside the electrical part housing unit 6 at the casing 2, it is not necessary to provide electric circuit boards at the body middle portion 4 of the casing 2 as has been the case in the prior art, to realize a layout with a thin body middle portion 4 at the casing 2.

Secondly, since the recording compression circuit system is provided at the grip unit 5 of the casing 2 and the recording compression circuit system extends parallel to the lens optical axis L, the width of the casing 2 in the left/right direction can be reduced to realize miniaturization, and by utilizing the space inside the grip unit 5, the thickness of the body middle portion 4 at the casing 2 can be reduced even when the first and second recording compression circuit boards 21 and 22 are long.

In addition, it is not needed that the thickness of the casing 2 have to be increased in correspondence to the shape of the external recording member 27 and the thickness of the board placed over the rear side of the image-capturing element board as has been the case in the prior art, so that a thin shape and structural miniaturization can be achieved.

The third advantage is that since the external recording member 27 is housed inside the grip unit 5, the projecting portion for holding the external recording member 27 is not required.

The fourth advantage is that since the liquid crystal display 32, which is an image display part, is provided inside the electrical part housing unit 6, the liquid crystal display 32 does not become hidden when the operator holds the grip unit 5 of the casing 2 by hand so that the liquid crystal display 32 can be seen easily, while assuring a large area of the liquid crystal display 32 at the same time.

The fifth advantage is that since the recording compression circuit parts and the image display parts are provided on the two sides of the plane M that includes the lens optical axis and the viewfinder optical axis, the single lens reflex type electronic still camera 1 assures a weight balance in the left/right direction that is comparable to that in a silver halide type single lens reflex camera and achieves a high degree of operability.

The sixth advantage is that in the single lens reflex type electronic still camera 1, the space occupied by the film chamber or the patrone as referred to with respect to a silver halide type single lens reflex camera can be utilized efficiently to achieve miniaturization.

The seventh advantage is that since the image-capturing element 8 which is readily affected by heat and noise is separated over a distance from the heat generating image display parts (the first and second inverter circuit boards 28 and 29, and the illuminating light source 32), it is protected from the heat generated by these image display parts.

The eighth advantage is that since the internal space of the casing 2 is divided into the internal space constituted of the middle space 23A where the image-capturing element 8 is provided, the first side space 23B and the second side space 23C by the two low heat generating electric circuit boards (the image display circuit board 19 and the first recording compression circuit board 21), convection of air from the spaces 23B and 23C is stopped or suppressed in the internal space constituted of the middle space 23A located between the two low heat generating electric circuit boards so that the middle space is not affected by the heat generated at the high heat generating electric circuit boards (the first and second inverter circuit boards 28 and 29, and the power source circuit board 25) to minimize any increase in the temperature at the image-capturing element 8 to prevent the image quality from becoming degraded.

The ninth advantage is that since the high heat generating electric circuit boards (the first and second inverter circuit boards 28 and 29) are provided in close proximity to the side wall of the electrical part housing unit 6 and the high heat generating electric circuit board (the power source circuit board 25) is provided in close proximity to the side wall of the casing 2, the distances between the image-capturing element 8 and the high heat generating electric circuit boards are increased so that even when the temperature of the image-capturing element 8 increases as a result of the temperature increase at the high heat generating electric circuit boards, the deterioration of the S/N ratio can be minimized to prevent the image quality from deteriorating.

The tenth advantage is that the illuminating light source 33 of the image display unit 31 constituting an image display part is separated over a distance from the image-capturing element 8, which prevents the temperature of the image-capturing element 8 from increasing to minimize the degree of loss of image quality.

The eleventh advantage is that since the electric circuits such as an A/D circuit for processing image signals from the image-capturing element 8 are divided and provided on the first and second image-capturing circuit boards 16 and 17 from the image-capturing element board 9, the following benefits are achieved.

(1) The size of the image-capturing element board 9 can be reduced to an absolute minimum to reduce the clearance in the left/right direction required for the left and right positional adjustment of the image-capturing element 8.

(2) While signals output by the image-capturing element 8 are readily affected by noise, the length of the wiring can be reduced by providing the first image capturing circuit board 16 at the bottom of the casing 2 to eliminate any adverse effect of noise. As a result, the image at the image-capturing element 8 is prevented from deteriorating due to the influence of heat and noise, to achieve a high quality image and, at the same time, the casing 2 can be miniaturized and made thinner.

(3) By providing the first image capturing circuit board 16 at the bottom of the casing 2, any increase of the overall thickness of the casing 2 can be prevented.

It is to be noted that while the embodiment above has been explained using the first recording compression circuit board 21 and the image display circuit board 19 as examples of low heat generating electric circuit boards, the present invention is not limited to these examples and the low heat generating electric circuit boards may be any other boards that do not generate a great quantity of heat.

In addition, while the internal space of the casing 2 is divided into the middle space 23A, the first side space 23B and the second side space 23C by the two low heat generating electric circuit boards (the image display circuit board 19, and the first recording compression circuit board 21) provided on the two sides of the image-capturing element 8 in the embodiment, partitioning plates may be employed in place of the low heat generating electric circuit boards. It is to be noted that the partitioning achieved by the two low heat generating electric circuit boards described above or partitioning plates does not have to constitute a completely sealed structure, and there is allowance for some gap. In other words, the internal space should be partitioned to achieve a structure in which air convection is prevented to the degree to which the heat generated by the high heat generating parts is discharged through other thermal conduction paths such as the side walls.

Furthermore, while the explanation has been given in reference to the embodiment on an example in which all the image display parts are provided inside the electrical part housing unit 6, the image display unit (the liquid crystal display and the illuminating light source) among the image display parts may be provided outside the electrical part housing unit 6, instead.

Moreover, while the right end of the first image capturing circuit board 16 is in contact with the inner surface of the first recording compression circuit board 21 via the cushion member 37, it is not always necessary to provide the cushion member 37.

Also, while the image-capturing element board 9 is mounted at the body mounting portion 2B in the embodiment, the image-capturing element board 9 may be mounted at the rear wall 10, instead.

Figure 4:
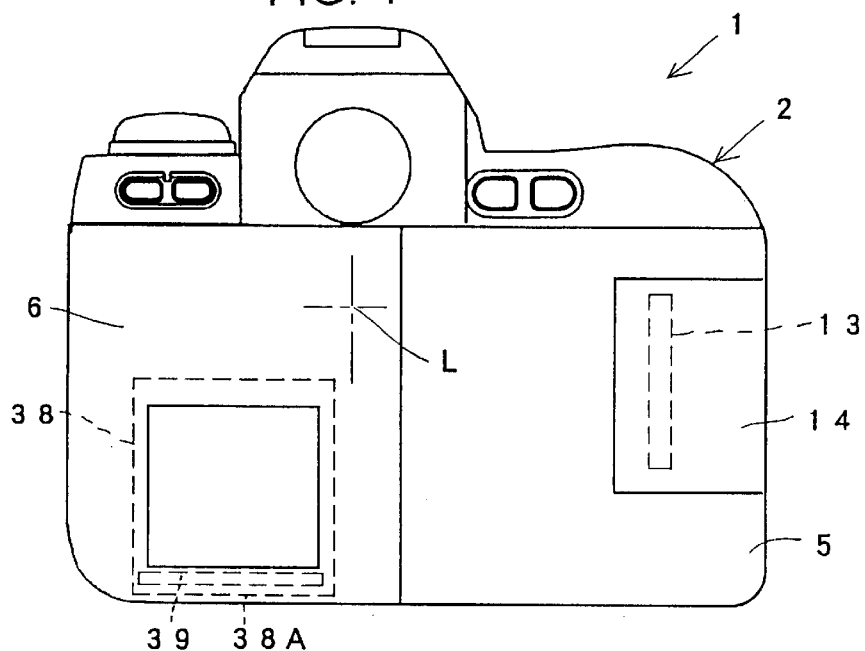
FIG. 4 is a rear view of the electronic still camera adopting another positional arrangement of the image display unit.

In addition, while the illuminating light source 33 is provided along the up/down direction in FIG. 3, parallel to the longitudinal side 32A of the quadrangular liquid crystal display 32 which is located furthest away from the lens optical axis L in the embodiment, an illuminating light source 39 may be provided parallel to a lateral side 38A in a configuration achieved by shifting the position of the liquid crystal display 38 downward compared to that illustrated in FIG. 3 so that the lateral side 38A of the liquid crystal display 38 is the furthest away from the lens optical axis L as illustrated in FIG. 4.

Furthermore, while the explanation has been given in reference to the embodiment on an example in which the electronic still camera is constituted of a single lens reflex type electronic still camera, the present invention is not limited to this example.

Figure 6:
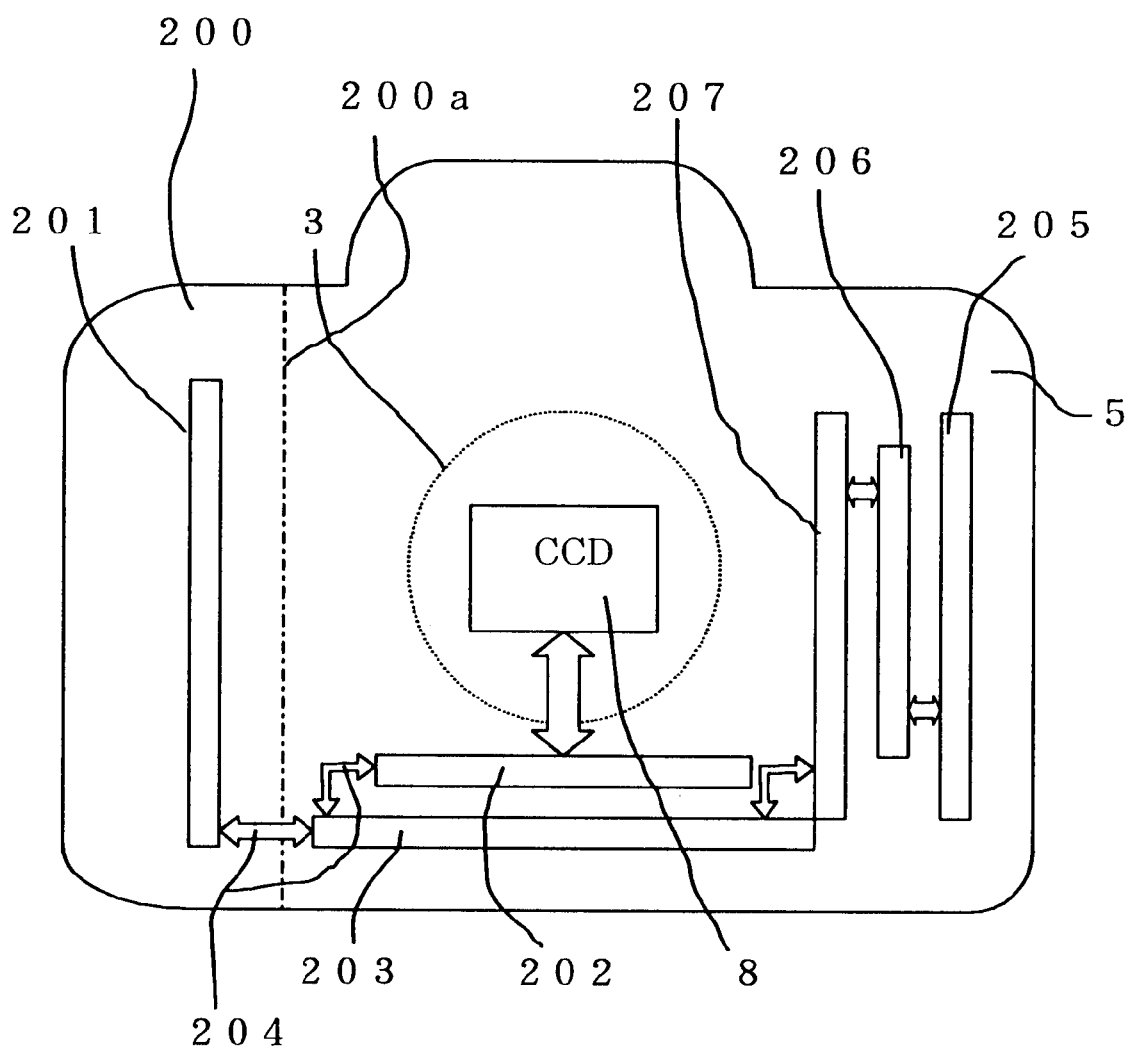
FIG. 6 is a schematic diagram illustrating the positional arrangement of various circuit boards in the electronic still camera in another embodiment.

Now, another embodiment is explained in reference to FIG. 6. The elements assigned with names identical to those assigned to the elements in the previous embodiment achieve functions identical to those explained earlier.

FIG. 6 is a schematic diagram illustrating the positional arrangement of the various circuit boards of an electronic still camera.

At this electronic camera, various units (e.g., a cellular phone unit, a printer unit, a communications unit, an image display unit, a multifunction control unit, etc.) 200 can be detachably mounted at a mounting portion 200a at a side surface of the camera body. Since the individual expansion units can be detachably mounted in this manner, the function of the electronic still camera can be expanded and appropriate units can be selected to suit specific purposes of use.

The cellular or mobile phone unit in this context refers to a unit internally provided with a telephone communication circuit, which is capable of transmitting photographic images that have been photographed with the electronic still camera via a partner telephone.

The printer unit refers to a unit that prints photographic images that have been photographed with the electronic still camera.

The communications unit refers to a unit that is capable of performing internet communications and the like of photographic images that have been photographed with the electronic still camera, via a microcomputer or the like.

The image display unit is a unit which is internally provided with an image display circuit and is also provided with a liquid crystal display to implement external display of photographic images that have been photographed with the electronic still camera.

The multifunction control unit may be a unit that is capable, for instance, of arbitrarily setting parameters for image processing to achieve an improvement in the photographing functions of the camera.

In more specific terms, as illustrated in FIG. 6, a circuit board (e.g., a telephone communication circuit, a printer drive circuit, a communications circuit, an image display circuit or the like) 201 of an expansion unit 200 is electrically connected to the low heat generating electric circuit boards (an image capturing circuit board 202 connected to the image-capturing element 8 and a first recording compression circuit board 203) provided at the bottom of the electronic still camera via a connector 204. The connector 204 is provided at a position at the bottom of the camera at which the distance from the unit 200 is the smallest. This achieves a compact circuit arrangement, and by replacing the expansion unit 200, the function of the electronic still camera can be expanded easily.

Inside the grip unit 5 of the electronic still camera, a high heat generating electronic circuit board, i.e., a power source circuit board 205, a recording medium (CF card) 206 and a second recording compression circuit 207, are sequentially provided from the outside. By providing the power source circuit board 205 which generates a great quantity of heat at the outermost position, a structure is achieved in which any adverse effect on the image-capturing element 8 is eliminated.

In addition, the image processing circuits (202, 203) which are low heat generating electric circuit boards are provided at the bottom of the camera so that image signals that have undergone image processing can be distributed with a high degree of efficiency to both sides of the electronic still camera (the grip unit 5 where the recording medium 206 and the like are provided and the mounting portion of the expansion unit 200) to minimize the influence of noise and the like.

Furthermore, a mounting portion 200a, which includes the mounting portion at the camera and the mounting portion at the expansion unit 200, is provided with a lock member that tightens the expansion unit 200 to the camera body firmly and the connector 204 that electrically connects the two circuit boards.

Figure 7:
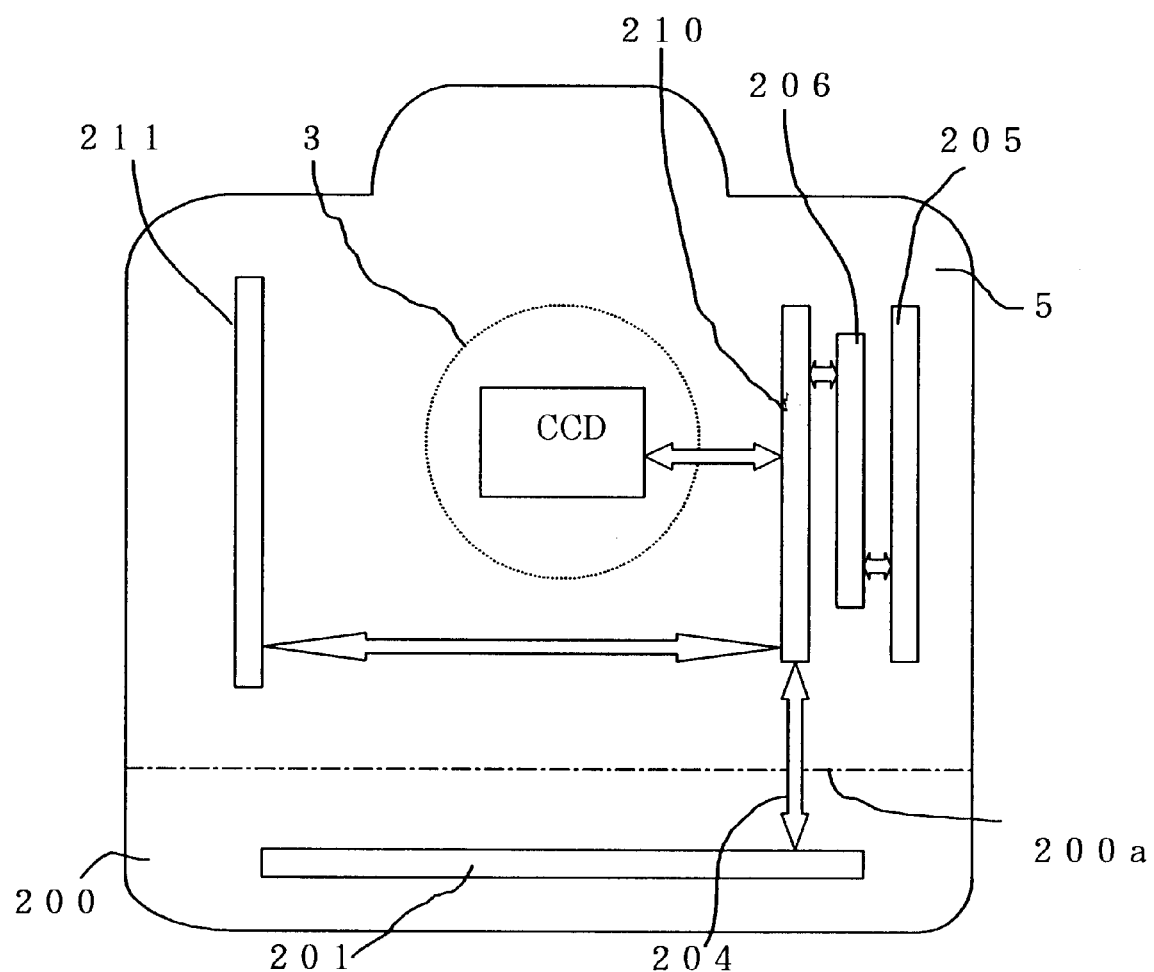
FIG. 7 illustrates an example of a variation of the embodiment illustrated in FIG. 6.

Next, another embodiment is explained in reference to FIG. 7.

FIG. 7 is an example of a variation of the embodiment illustrated in FIG. 6, and this example differs from the embodiment in FIG. 6 in that the expansion unit 200 is detachably mounted at the bottom of the electronic still camera. An image processing circuit board 210 has, in combination, all the functions achieved by the image capturing circuit board 202, the first recording compression circuit board 203 and the second recording compression circuit board 207 described earlier. In addition, a display circuit board 211 constitutes a drive circuit for driving the liquid crystal display provided at the rear side of the electronic still camera. The image processing circuit board 210, which is located between the recording medium 206 and the expansion unit 200, is capable of distributing signals that have undergone image processing to both the recording medium 206 and the expansion unit 200 with a high degree of efficiency and minimizing the influence of noise and the like.

By adopting either of the embodiments illustrated in FIGS. 6 and 7, the functions of the electronic still camera can be expanded with ease without having to increase the thickness of the body of the electronic still camera to achieve a system that accommodates specific purposes of use.

What is claimed is:

1. An electronic still camera having a casing in which an image-capturing element is provided, said casing comprising:

a body middle portion in which said image-capturing element is provided in close proximity to a rear wall of said body middle portion;

a grip unit that is formed continuous to said body middle portion on one side in a left/right direction and projects out further forward relative to a front wall of said body middle portion; and an electrical part housing unit that is formed continuous to said body middle portion on another side in the left/right direction and has a housing space, wherein:

one or more recording compression circuit parts are provided inside said grip unit; and one or more image display parts are provided inside said electrical part housing unit.

2. An electronic still camera according to claim 1, wherein:

an image display unit among said image display parts is provided offset in the left/right direction relative to said image-capturing element.

3. An electronic still camera according to claim 1, wherein:

inside said casing, low heat generating electric circuit boards are each provided on either a left or right side of said image-capturing element across said image-capturing element and high heat generating electric circuit boards are provided further outward in the left/right direction relative to said low heat generating electric circuit boards, respectively.

4. An electronic still camera according to claim 1, wherein:

an illuminating light source of said image display parts is formed in a cylindrical shape and is positioned parallel to one side of a quadrangular liquid crystal display that is furthest away from a lens optical axis.

5. An electronic still camera according to claim 1, wherein:

a first electric circuit board for suppressing air convection is provided between said body middle portion and said grip unit; and a second electric circuit board for suppressing air convection is provided between said body middle portion and said electrical part housing unit.

6. An electronic still camera according to claim 5, wherein:

said first electric circuit board and said second electric circuit board are each constituted of a low heat generating electric circuit board.

7. An electronic still camera having a casing in which an image-capturing element is provided, said casing comprising:

a body middle portion in which said image-capturing element is provided in close proximity to a rear wall of said body middle portion;

a first electrical part housing unit that is formed continuous to said body middle portion on one side in a left/right direction and has a housing space; and a second electrical part housing unit that is formed continuous to said body middle portion on another side in the left/right direction and has a housing space, wherein:

one or more high heat generating electric circuit boards are provided inside said first electrical part housing unit;

one or more high heat generating electric circuit boards are provided inside said second electrical part housing unit;

said first electrical part housing unit is formed to project out further forward relative to a front wall of said body middle portion and is provided with a grip unit;

said high heat generating electric circuit board provided inside said first electrical part housing unit includes a power source circuit part;

said high heat generating electric circuit board provided inside said second electrical part housing unit includes an image display inverter circuit part;

a first electric circuit board for suppressing air convection is provided between said body middle portion and said first electrical part housing unit; and a second electric circuit board for suppressing air convection is provided between said body middle portion and said second electrical part housing unit.

8. An electronic still camera having a casing in which an image-capturing element is provided, said casing comprising:

a body middle portion in which said image-capturing element is provided in close proximity to a rear wall of said body middle portion;

a first electrical part housing unit that is formed continuous to said body middle portion on one side in a left/right direction and has a housing space; and a second electrical part housing unit that is formed continuous to said body middle portion on another side in the left/right direction and has a housing space, wherein:

one or more high heat generating electric circuit boards are provided inside said first electrical part housing unit;

one or more high heat generating electric circuit boards are provided inside said second electrical part housing unit;

a first partitioning plate for suppressing air convection is provided between said body middle portion and said first electrical part housing unit;

a second partitioning plate for suppressing air convection is provided between said body middle portion and said second electrical part housing unit; and said first partitioning plate and said second partitioning plate are each constituted of a low heat generating electric circuit board.

* * * * *